United States Patent [19]

Wuertz

[11] Patent Number: 5,237,128
[45] Date of Patent: Aug. 17, 1993

[54] ABOVE-FLOOR SERVICE FITTING FOR POKE-THROUGH WIRING DEVICE

[75] Inventor: Emil S. Wuertz, Madison, Conn.
[73] Assignee: Hubbell Incorporated, Orange, Conn.
[21] Appl. No.: 766,131
[22] Filed: Sep. 27, 1991
[51] Int. Cl.$^5$ .............................................. H02G 3/22
[52] U.S. Cl. ......................................... 174/48; 174/53
[58] Field of Search ............................ 174/48, 49, 53; 52/220.8

[56] References Cited

U.S. PATENT DOCUMENTS

| | | | |
|---|---|---|---|
| 3,110,754 | 11/1963 | Witort et al. | 174/48 |
| 4,243,835 | 1/1981 | Ehrenfels | 174/48 |
| 4,272,643 | 6/1981 | Carroll et al. | 174/48 |
| 4,323,723 | 4/1982 | Fork et al. | 174/48 |
| 4,336,416 | 6/1982 | Goodsell | 174/48 |
| 4,496,790 | 1/1985 | Spencer | 174/48 |

Primary Examiner—Leo P. Picard
Assistant Examiner—David A. Tone
Attorney, Agent, or Firm—Jerry M. Presson; Frederick J. Haesche

[57] ABSTRACT

A poke-through wiring device for mounting in a bore opening through a concrete floor slab includes individual tubes for through-floor passage of power supply and data/communication conductors, an intumescent barrier for sealing the bore, and an above-floor service fitting having a main frame including a bottom wall having spaced apart power supply and low voltage data/communication openings therethrough. A pair of opposing sidewalls extend upwardly from the bottom wall and each defines a plurality of receptacle openings. A unitary receptacle barrier mounted on and cooperating with the frame isolates the power supply opening, at least one receptacle opening in one of the sidewalls and at least two of the receptacle openings in the other of the sidewalls from the data/communication opening. An auxiliary frame may be connected to the main frame to increase the number of available receptacle openings.

20 Claims, 4 Drawing Sheets

ABOVE-FLOOR SERVICE FITTING FOR POKE-THROUGH WIRING DEVICE

BACKGROUND OF THE INVENTION

This invention relates in general to wiring devices and deals more particularly with improvements in above-floor service fittings for poke-through wiring devices which include power supply and low voltage service. A wiring device of the type with which the present invention is concerned is particularly adapted for anchoring within a bore formed in and opening through a concrete floor slab or the like to provide for passage through the slab of power supply and low voltage data/communication conductors which terminate at associated receptacles mounted on an above-floor service fitting which comprises part of the device.

Current popularity of open space offices utilizing modular work stations having state-of-the-art voice/data communication equipment has created need for improved poke-through wiring devices to accommodate varying arrays of power supply and low voltage receptacles at above-floor locations. The number of receptacles including power supply receptacles and low voltage data/communication outlets provided at a given location will, of course, be determined by the requirements of the equipment to be accommodated at that location, but generally, the number of low voltage data/communication outlets required at a given workstation will exceed the number of power supply receptacles required at that station.

Safety requirements generally dictate that an above-floor service fitting for accommodating both low voltage and power supply conductors be provided with an internal divider to separate power and low voltage wiring, so that the low voltage terminations within the fitting may be safely serviced without risk of accidental contact with the power supply terminations. Accordingly, it is the general aim of the present invention to provide a poke-through wiring device having an improved above-floor service fitting enabling varying arrangements of power supply and low voltage receptacles which are isolated from each other to satisfy the aforesaid requirement and which may be readily expanded to accommodate system growth.

SUMMARY OF INVENTION

In accordance with the present invention, an above floor service fitting for a poke-through wiring device includes a frame having a bottom wall defining separate, spaced apart power supply and low voltage openings for passage therethrough of power supply and low voltage conductors and a pair of opposing sidewalls which extend upwardly from the bottom wall and define a plurality of individual receptacle openings. A unitary receptacle barrier mounted on and cooperating with the frame isolates the low voltage opening from the power supply opening, at least one of the receptacle openings in one of the sidewalls and a plurality of the receptacle openings in the other of the sidewalls, whereby a low voltage receptacle mounted on the above-floor service fitting may be serviced without risk of accidental contact with power supply conductors.

DETAILED DESCRIPTION OF PREFERRED EMBODIMENT

Figure 1:
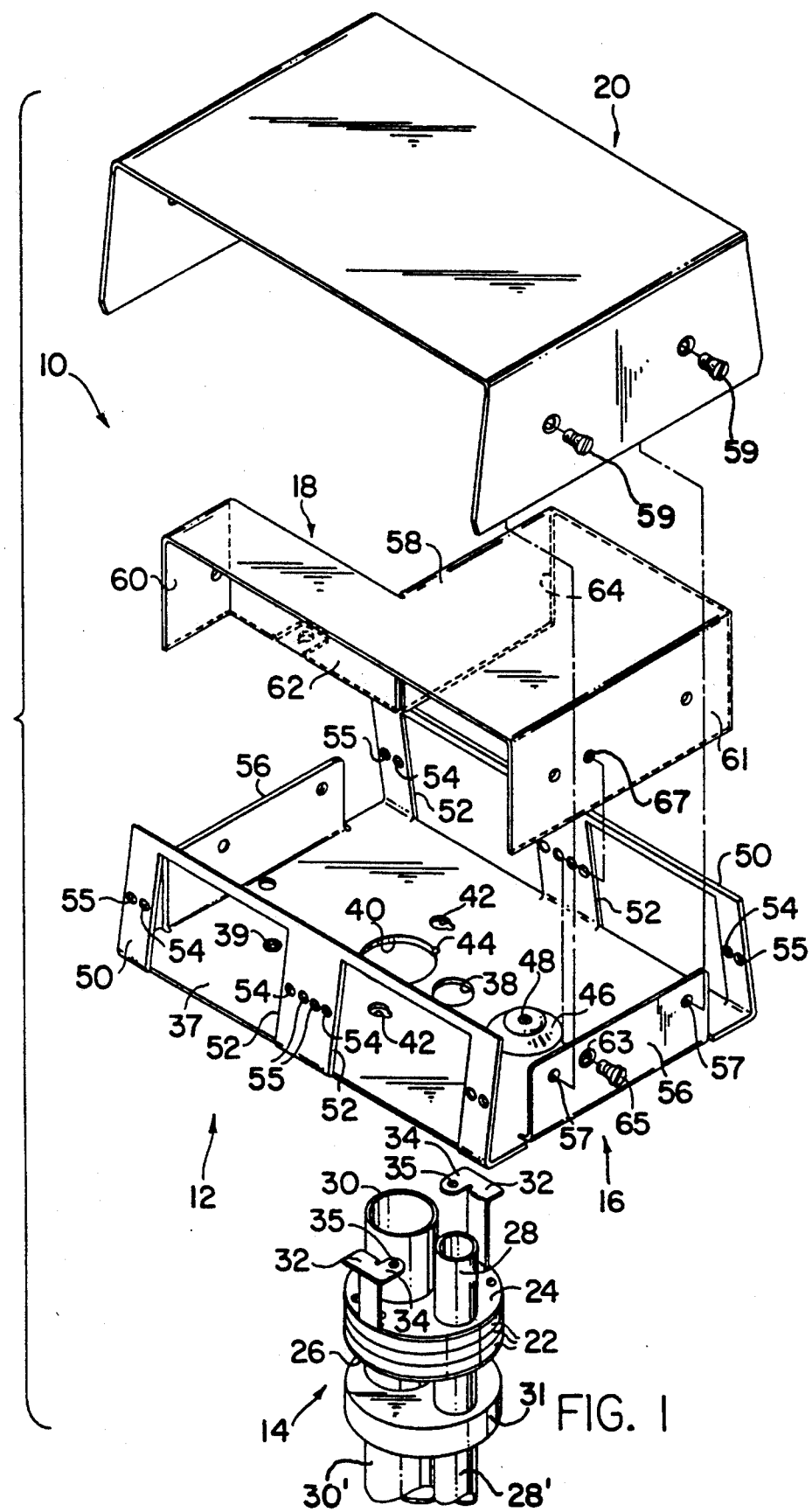
FIG. 1 is an exploded perspective view of a poke-through wiring device embodying the present invention.
Figures 2, 4:
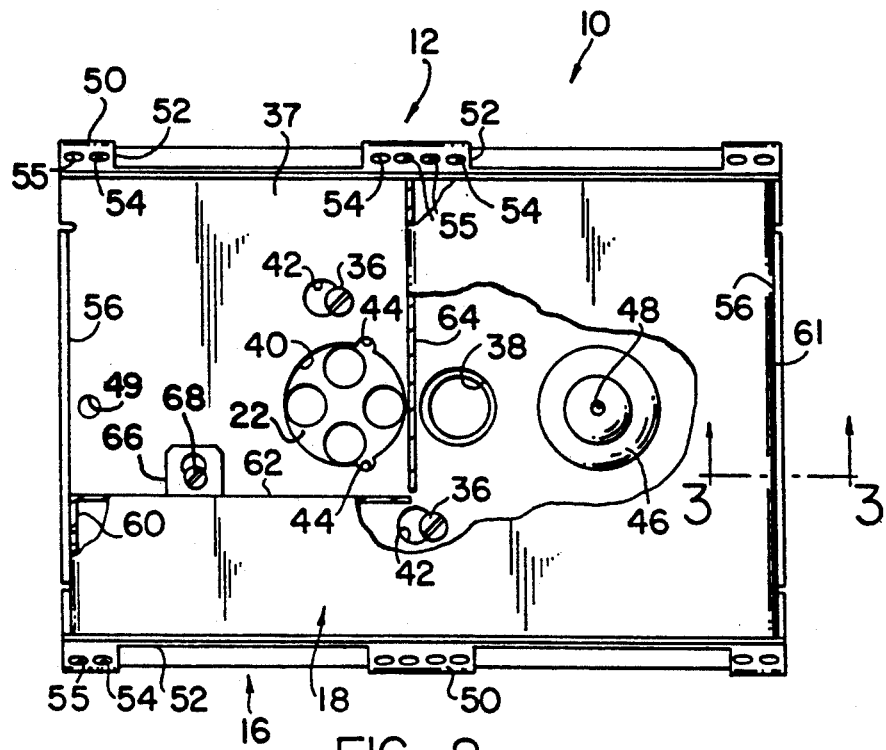
FIG. 2 is a plan view of the wiring device of FIG. shown with the cover removed and portions of the receptacle barrier broken away to reveal structure thereunder.
FIG. 4 is similar to FIG. 3 but shows an auxiliary above-floor service fitting attached to the device.
Figure 3:
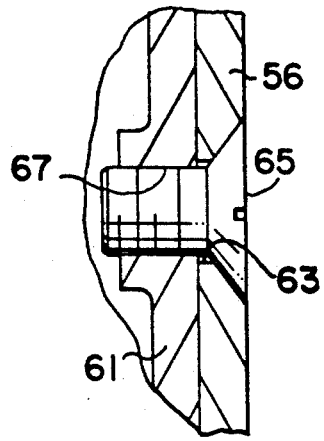
FIG. 3 is a somewhat enlarged fragmentary sectional view taken along the line 3—3 of FIG. 2.

Turning now to the drawings and referring first particularly to FIGS. 1-3, a poke-through wiring device embodying the present invention and indicated generally by the reference numeral 10 is particularly adapted for mounting within a bore opening through a concrete floor slab or the like (not shown) to provide for passage through the slab of both power supply and low voltage conductors, in a manner well known in the art. The device 10 includes an above-floor service fitting, indicated generally at 12, for receiving and supporting a plurality of receptacles of differing types (not shown) used to terminate the various power supply and low voltage conductors. The device also has a through-floor fitting, best shown in FIG. 1 and designated generally by the numeral 14, for mounting in fixed position within the floor slab bore and upon which the service fitting 12 is mounted. The multi-service fitting 12 is compartmentalized and includes a frame indicated generally at 16, a receptacle barrier designated generally by the numeral 18, for isolating power supply receptacles which terminate the power supply conductors from those receptacles which terminate low voltage voice/data communication conductors, and a cover 20, all of which will be hereinafter further discussed.

Considering now the wiring device 10 in further detail, the above-floor service fitting 12 is particularly adapted for use with poke-through or through-floor fittings such as the PT7XC and the 2 inch PT27 Poke-Through, produced and marketed by Hubbell, Inc., Orange, Conn. 06477, assignee of the present invention. The through-floor fitting 14, shown in FIG. 1, is typical of such fittings and comprises a stationary fire barrier which includes at least one intumescent disc 22 for generally complementing an associated portion of a floor slab bore opening in which it is received. However, the illustrated stationary fire barrier has a plurality of discs 22,22 sandwiched between plates which include an upper plate 24 and a lower plate 26. A pair of axially elongate poke-through tubes or conduits which include a power supply tube 28 and a low voltage or telecommunication tube 30 are integrally connected to and extend for some distance above the upper plate 24, substantially as shown. Lower portions of the conduits 28 and 30, designated 28' and 30', depend from the lower plate 26 and support an adjustable fire barrier 31 preferably made from intumescent material. Generally diametrically opposed arms 32,32 are integrally connected and extend upwardly from generally diametrically opposite edges of the circular upper plate 24 and terminate at radially outwardly turned mounting pads 34,34. The mounting pads are disposed within a common plane and define threaded apertures 35,35 for receiving fasteners 36,36 shown in FIG. 2 and used to install the above-floor service fitting 12 on the through-floor fitting 14.

The frame 16 may be made from any suitable material but preferably it is formed from sheet metal of substantially uniform thickness and has a generally rectangular bottom wall 37 which defines spaced apart power supply and low voltage openings, indicated respectively at 38 and 40. A pair of key slots 42,42 formed in the bottom wall at diametrically opposing sides of the low voltage opening 40, and best shown in FIG. 1, receive the fasteners 36,36 which secure the above-floor fitting 12 to a through-floor fitting such as the Hubbell PT7XC Poke Through or the illustrated fitting 14. Another set of key slots 44,44 at opposite sides of the low voltage opening 40 communicate with the latter opening for receiving fasteners associated with another through-floor fitting such as the Hubbell PT27 Through-Floor Fitting (not shown) which may be used in place of the fitting 14. Preferably, and as shown, the low voltage opening 40 is somewhat larger than the power supply opening 38. The power supply opening 38 will accommodate up to ten (10) No. 12 AWG power wires, whereas up to four (4) 25 pair telephone cables may be brought up through the low voltage opening 40 when the device 10 is assembled with a PT7XC Poke-Through, for example. The bottom wall 37 also has a threaded barrier mounting aperture 39 and a raised boss 46 which defines another threaded aperture 48 for receiving an associated grounding fastener. A pair of apertures 49,49 (one shown) open through the bottom wall 37 near the opposite ends thereof to receive fasteners for securing the frame 16 to an associated concrete floor using plastic or lead anchors, as necessary.

A pair of opposing sidewalls 50,50 extend upwardly from the bottom wall 37 and are upwardly and inwardly inclined toward each other. Each sidewall 50 defines a plurality of generally rectangular spaced apart receptacle openings 52,52 for receiving receptacles of various types as, for example, duplex, single, telephone/data and furniture feed receptacles. The illustrated above-floor service fitting 12 has four receptacle openings 52,52 and is particularly adapted to support three power supply receptacles (not shown) and one low voltage receptacle (not shown). Threaded fastener receiving openings 54,54 are formed in each sidewall near opposite ends of each receptacle opening 52 to receive fasteners used to secure a selected receptacle (not shown) within each receptacle opening. Additional threaded fastener receiving openings 55,55 are provided in the sidewalls for receiving fasteners used to secure receptacle faceplates (not shown) on the frame 16. A pair of integral end walls 56,56 extend upwardly from and in normal relation to the frame bottom wall 37. Preferably, and as shown, the end walls 56,56 have a substantially lower profiles than the sidewalls 50,50 and terminate in spaced relation to the sidewalls, substantially as shown in FIG. 1. Each end wall has a pair of threaded cover mounting apertures 57,57 for receiving cover mounting screws 59,59 and a cylindrical countersunk aperture 63 for receiving a flat head barrier mounting screw 65 used to secure the receptacle barrier 18.

The receptacle barrier 18, as shown in FIGS. 1 and 2 has a generally L-shaped top wall 58, as viewed from above, and is used to isolate the power supply opening 38 and three of the four receptacle openings 52,52 from the low voltage opening 40 and the one remaining receptacle opening 52 in the frame 16. A pair of end walls 60 and 61 and a plurality of intersecting dividing walls 62 and 64 depend from the barrier top wall 58. Openings along opposite sides of the barrier 18 accommodate receptacles to be mounted within associated receptacle openings 52,52. The receptacle barrier 18 is secured to the frame 16 by the fastener 65 engaged within a threaded opening 67 in the barrier end wall 61, as shown in FIG. 3. The barrier is further secured by a mounting tab 66 integrally secured to the barrier wall 62. The tab defines a key slot which receives a fastener 68 threadably engaged in the aperture 39.

The upper portion of the barrier 18, as viewed from above in FIG. 2 and which includes the dividing wall 64, extends along approximately one-half the length of one of the sidewalls. The lower portion of the barrier, which includes the dividing wall 62, extends substantially along the entire length of the other of the sidewalls 50. The receptacle barrier 18 cooperates with the frame 16 and the cover 20 to divide the interior of the above-floor service fitting 12 into two compartments, one compartment communicating with three power supply receptacle openings 52,52 and containing the power supply opening 38 and the other compartment communicating with the remaining receptacle opening 52, for mounting a low voltage receptacle or data/communication outlet, and containing that portion of the bottom wall 37 which includes the low voltage opening 40.

The two separable components 12 and 14 which comprise the poke-through wiring device 10 may be installed as a unit or, if desired, the through-floor fitting 14 may be installed in the floor during a roughing-in stage of construction and the above-floor fitting 12 connected to it at a later time. The latter option enables the above-floor fitting to be installed after furniture is in place, thereby reducing risk of damage to the above-floor fitting by movement of furniture or other heavy equipment.

Figure 5:
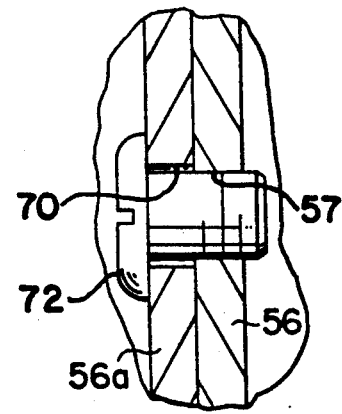
FIG. 5 is a somewhat enlarged fragmentary sectional view taken along the line 5—5 of FIG. 4.

If desired, the illustrated above-floor fitting 12 may be enlarged or expanded to accommodate additional low voltage voice/data receptacles by ganging it with an auxiliary above-floor service fitting of like kind. Such a ganged assembly is shown in FIG. 4, wherein the frame 16 is shown connected to the frame 16a of an adjacent auxiliary above-floor fitting indicated at 12a. The auxiliary frame 16a is substantially identical in most respects to the frame 16, previously described, but it does not have a power supply opening, a low voltage opening and key slots in its bottom wall. Further, and as best shown in FIG. 5, one end wall 56a has cylindrical apertures 70 for registry with the threaded apertures 57,57 in the adjacent wall 56 to receive fasteners 72 for retaining the frames 16 and 16a in end-to-end in-line relation to each other. The frame 16a provides additional receptacle openings 52a,52a to accommodate additional low voltage data/communication outlets. Since the profile of the end walls 56 and 56a is substantially lower than the profile of the sidewalls 50,50, the low voltage conductors to be terminated on the auxiliary fitting 12a may pass from the fitting 12 over the end walls 56 and 56a and into the fitting 12a. Any unused receptacle opening may be covered by a blank faceplate of appropriate size (not shown). A cover 20a of suitable length is provided to envelope both the frame 16 and the auxiliary frame 16a to complete the expanded above-floor service fitting.

Figure 6:
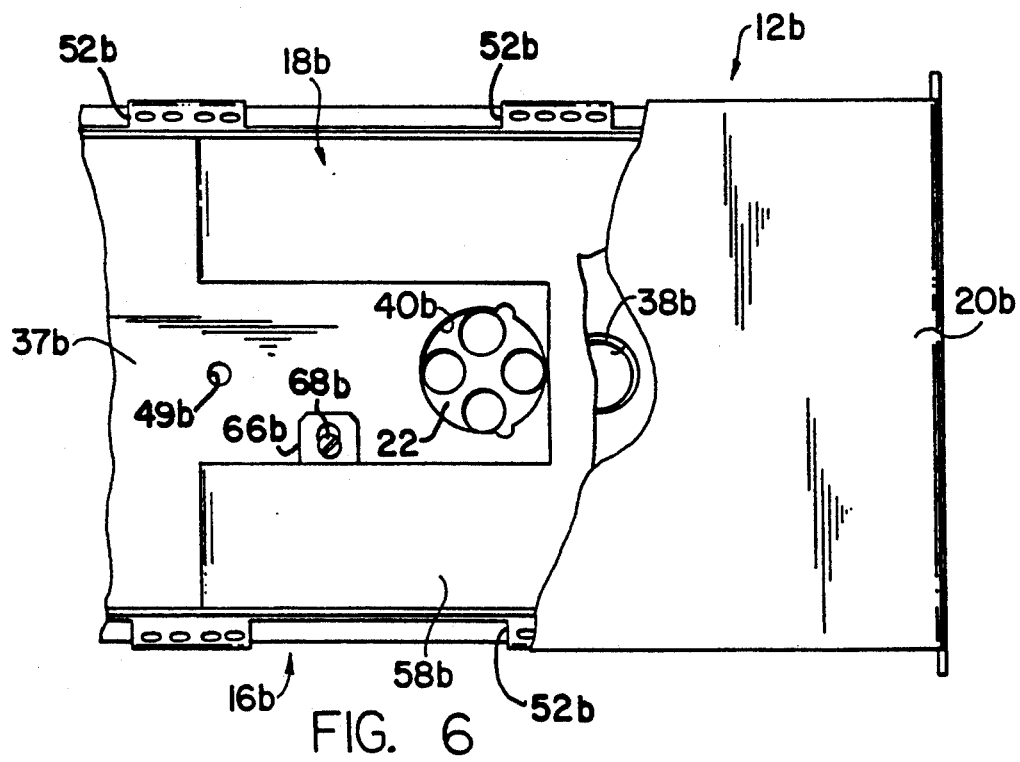
FIG. 6 is similar to FIG. 2, but shows another poke-through wiring device embodying the invention.

Referring now to FIG. 6, another above-floor service fitting embodying the present invention is indicated generally by the reference numeral 12b. Like the previously described fitting 12, the fitting 12b includes a frame 16b, a receptacle barrier 18b and a cover 20b. The receptacle barrier 18b is adapted to isolate from a low voltage opening 40b formed in the bottom wall 37b, a power supply opening 38b and four receptacle openings 52b,52b for receiving power supply receptacles.

The frame 16b is substantially similar to the frame 16 previously described, but, as shown, is of indeterminate length. Thus, the frame 16b may have receptacle openings for accommodating six, eight or more receptacles or outlets. Four of the receptacle openings 52b,52b constitute power supply receptacle openings and are isolated from the remaining receptacle openings by a barrier 18b.

Figure 7:
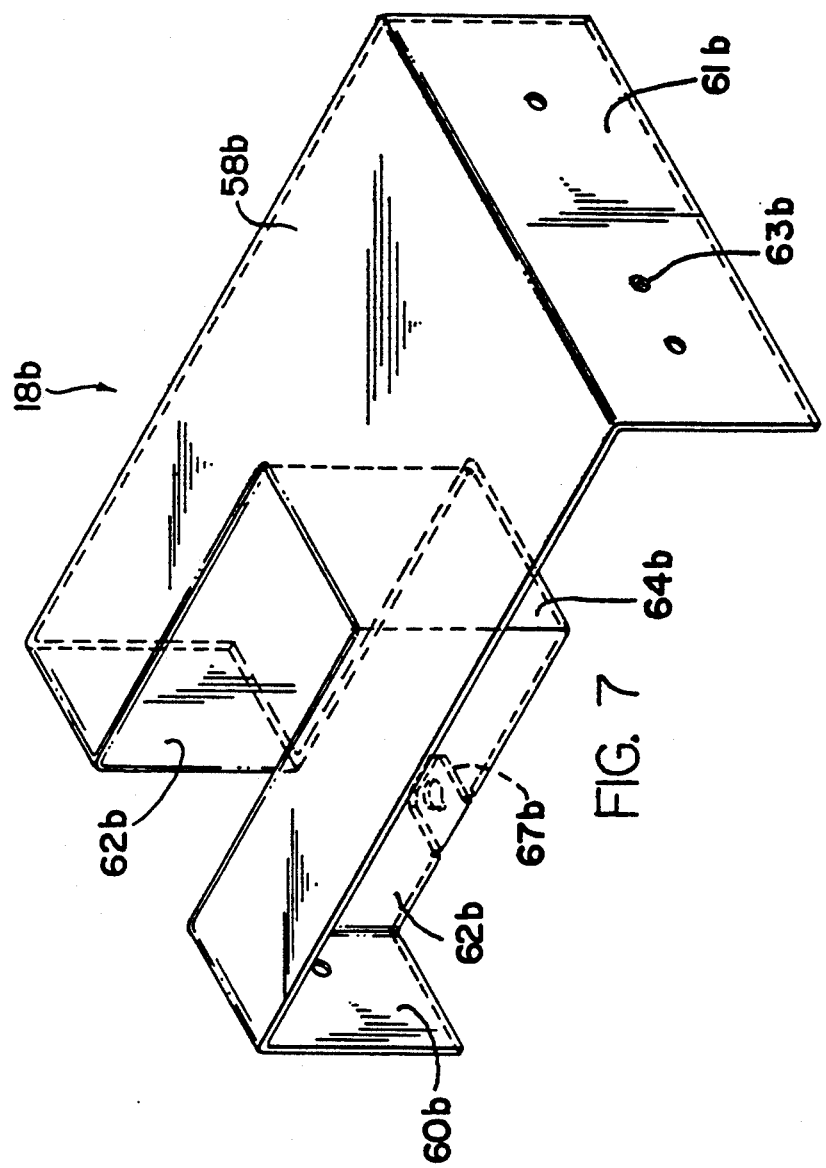
FIG. 7 is a perspective view of the receptacle barrier shown in FIG. 6.

The receptacle barrier 18b, best shown in FIG. 7, has a U-shaped top wall 58b, as viewed from above in FIG. 6, and dividing walls 62b,62b and 64 which depend from the top wall. A portion of the barrier 18b extends transversely of the frame 16b between the frame side walls between a pair of opposing receptacle openings 52b,52b. The depending wall 64b extends between and separates a power supply opening 38b from a low voltage opening 40b. Portions of the U-shaped receptacle barrier 18b, extend longitudinally of the frame 16b, substantially as shown, and separate the power supply opening 38b and four of the receptacle openings 52b,52b from the low voltage opening 38b. The receptacle barrier 18b is open along its opposite sides, as best shown in FIG. 7, to accommodate four power supply receptacles which may be mounted on the frame 16b. The barrier 18b is secured to the frame 16b in the same manner that the barrier 18 is secured to the frame 16 previously described. A cover 20b of suitable size completes the assembly.

I claim:

1. In a poke-through wiring device having an above-floor service fitting, a through-floor fitting for positioning in a bore opening through a floor slab or the like and including conduit means for passage therethrough of power supply and low voltage conductors, and fastening means for securing the service fitting to the through floor fitting, the improvement wherein said service fitting comprises a main frame including a bottom wall having spaced apart power supply and low voltage openings therethrough and a pair of opposing sidewalls extending upwardly from said bottom wall, each of said sidewalls defining a plurality of openings for electrical receptacles, a unitary receptacle barrier, and means for releasably securing said receptacle barrier in assembly with said main frame, said receptacle barrier cooperating in assembly with said main frame to isolate from said low voltage opening said power supply opening and at least one of the receptacle openings in one of said sidewalls and a plurality of the receptacle openings in the other of said sidewalls.

2. In a poke-through wiring device as set forth in claim 1 the further improvement wherein said receptacle barrier cooperates with said frame to isolate three of said receptacle openings from said main low voltage opening.

3. In a poke-through wiring device as set forth in claim 1 the further improvement wherein said receptacle barrier cooperates with said main frame to isolate a plurality of said receptacle openings in said one of said sidewalls from said low voltage opening.

4. In a poke-through wiring device as set forth in claim 3 the further improvement wherein said receptacle barrier cooperates with said frame to isolate four of said receptacle openings from said low voltage opening.

5. In a poke-through wiring device as set forth in claim 1 the further improvement comprising an auxiliary frame having a bottom wall and a pair of opposing auxiliary frame sidewalls, said auxiliary frame sidewalls defining a plurality of receptacle openings, and attaching means for securing said auxiliary frame in end to end relation to said main frame to form an extension of said main frame.

6. In a poke-through wiring device as set forth in claim 5 the further improvement wherein said receptacle barrier isolates said power supply opening and all of said receptacle openings defined by said main frame from said low voltage opening.

7. In a poke-through wiring device as set forth in claim 5 wherein said main frame has a pair of opposing end walls and said auxiliary frame has a pair of opposing end walls and said attaching means comprises means for connecting one end wall of said main frame to an associated end wall of said auxiliary frame.

8. In a poke-through wiring device as set forth in claim 7 the further improvement wherein at least said one end wall of said main frame and said associated end wall of said auxiliary frame have a lower profile than said sidewalls.

9. In a poke-through wiring device as set forth in claim 7 the further improvement wherein at least said one end wall of said main frame and said associated end wall of said auxiliary frame have a lesser width dimension than said bottom wall of said main frame and said bottom wall of said auxiliary frame.

10. In a poke-through wiring device as set forth in claim 1 the further improvement wherein said receptacle barrier has a top wall and a plurality of intersecting dividing walls depending from said top wall.

11. In a poke-through wiring device as set forth in claim 10 the further improvement wherein said top wall has a generally L-shape as viewed from above.

12. In a poke-through wiring device as set forth in claim 10 the further improvement wherein said top wall has a generally U-shape as viewed from above.

13. An above-floor service fitting for attachment to a through-floor fitting in a poke-through wiring device, said service fitting comprising a frame having a bottom wall defining a power supply opening and a low voltage opening spaced from said power supply opening, a pair of opposing sidewalls extending upwardly from said bottom wall, each of said sidewalls defining a plurality of separate receptacle openings, a unitary receptacle barrier, and attaching means for releasably securing said receptacle barrier in assembly with said frame, said receptacle barrier in assembly with said frame cooperating with said bottom wall and said sidewalls to isolate from low voltage opening said power supply opening and at least one of said receptacle openings in one of said sidewalls and at least two of said receptacle openings through the other of said sidewalls.

14. An above-floor service fitting as set forth in claim 13 the further improvement wherein said service fitting isolates at least two of said receptacle openings in said one wall from said low voltage opening.

15. An above-floor service fitting as set forth in claim 13 wherein said receptacle barrier includes a top wall and a plurality of intersecting dividing walls depending from said top wall.

16. An above-floor service fitting as set forth in claim 15 wherein said top wall has a generally L-shaped configuration as viewed from above.

17. An above-floor service fitting as set forth in claim 15 wherein said top wall has a generally U-shaped configuration as viewed from above.

18. An above-floor service fitting as set forth in claim 13 wherein said frame has a pair of opposing end walls and said attaching means comprises means for securing said receptacle barrier to an associated one of said end walls.

19. An above-floor service fitting as set forth in claim 13 including connecting means for releasably securing said service fitting to said through-floor fitting.

20. An above-floor service fitting as set forth in claim 19 wherein said connecting means comprises a pair of key slots formed in said bottom wall.

* * * * *